(12) United States Patent
Lundstrom et al.

(10) Patent No.: US 7,289,480 B2
(45) Date of Patent: Oct. 30, 2007

(54) APPLICATIONS BASED RADIO RESOURCE MANAGEMENT IN A WIRELESS COMMUNICATION NETWORK

(75) Inventors: Anders Lundstrom, La Jolla, CA (US); Henrik Basilier, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 1092 days.

(21) Appl. No.: 10/178,107

(22) Filed: Jun. 24, 2002

(65) Prior Publication Data

US 2003/0235171 A1 Dec. 25, 2003

(51) Int. Cl.
*H04Q 7/24* (2006.01)
(52) U.S. Cl. .................. 370/338; 370/328; 370/401; 370/235
(58) Field of Classification Search .............. None
See application file for complete search history.

(56) References Cited

U.S. PATENT DOCUMENTS

| 6,748,247 | B1 * | 6/2004 | Ramakrishnan et al. .... 455/574 |
| 6,781,972 | B1 * | 8/2004 | Anderlind et al. .......... 370/329 |
| 6,888,807 | B2 * | 5/2005 | Heller et al. ................ 370/328 |
| 6,944,459 | B2 * | 9/2005 | Parantainen et al. ..... 455/452.1 |
| 7,023,825 | B1 * | 4/2006 | Haumont et al. ........... 370/338 |
| 2003/0227871 | A1 * | 12/2003 | Hsu et al. ................... 370/230 |

FOREIGN PATENT DOCUMENTS

| CA | 2299994 | 2/2001 |
| EP | 1096742 | 5/2001 |
| EP | 1154663 | 11/2001 |
| WO | WO 9905828 | 2/1999 |
| WO | WO 0247328 | 6/2002 |

OTHER PUBLICATIONS

Tajima K et al: "A Resource Management Architecture Over Differentiated Services Domains for Guarantee of Bandwidth, Delay and Jitter" IEEE/AFCEA Eurocomm. Information Systems for Enhanced Public Safety and Security, 2000, pp. 242-249, XP010515077.

* cited by examiner

*Primary Examiner*—Bob A. Phunkulh
(74) *Attorney, Agent, or Firm*—Coats & Bennett, P.L.L.C.

(57) ABSTRACT

A wireless communication network manages communication resources based on the types of packet data being carried by the network for each mobile station. Packet data for each use is matched to packet matching filters in defined flow type profiles. Each flow type profile corresponds to an expected application behavior and includes one or more resource control parameters having values set with regard to that expected behavior. An application activity profile is generated for each mobile station based on deriving resource control parameters using parameter values corresponding to the active flows for each mobile station. The network determines each mobile station's active flows based on matching that mobile station's packet data types to one or more of the defined flow type profiles. Thus, the network manages communication resources individually and/or jointly for its users based on the type of packet data traffic passing through the network for each of those users.

54 Claims, 11 Drawing Sheets

APPLICATIONS BASED RADIO RESOURCE MANAGEMENT IN A WIRELESS COMMUNICATION NETWORK

BACKGROUND OF THE INVENTION

The present invention generally relates to the management and control of communication resources within a wireless communication network, and particularly relates to basing the management of communication resources for a given mobile station based on the types of communication traffic associated with that mobile station.

As wireless communication networks evolve in terms of sophistication, data rates, and capacity, the nature of their use also evolves. That is, users of modern wireless communication systems enjoy a relatively broad range of services enabled, in large measure, by the transition to digital communications, and, in particular, by the transition to standardized packet data protocols and services.

However, packet data services, such as those services provided in wireless networks based on the Internet Protocol (IP), provide a basis for a range of service types. For example, a given network user might be sending or receiving email via his mobile station while another user is receiving streaming media or is Web browsing via her wireless device. Other examples come to mind, such as users accessing Internet-based instant messaging services, using Voice-over-IP (VoIP), or engaging in multicasting applications.

While the above examples generally involve the transfer of packet data-based communication traffic through the wireless communication network, differences exist in the various network resources and configurations used to efficiently support the different types of applications. For example, in variable data rate networks where users are served at data rates generally matched to their service needs, the efficient allocation and management of radio resources depends on the characteristics of the user's particular application or applications.

Generally, the network is not "application aware" in that the various network entities involved in setting up and managing the physical and logical resources to support a given user's data connection(s) do not have any real sense of the expected behavior of the application or applications to be supported by that data connection. The absence of such knowledge compromises to some extent the network's ability to efficiently manage the various resources it allocates to network users.

BRIEF SUMMARY OF THE INVENTION

The present invention provides a method and apparatus for managing wireless communication network resources based on identifying the types of data packets passing through the network. Different packet types correspond to differing applications or application types, with the various types of applications having different "flows" associated with their corresponding packet traffic. Thus, by observing the type of packet data passing through the network for one or more network users, the network can more efficiently manage selected communication resources based on the expected application behavior associated with those packet data types.

In an exemplary embodiment, the network defines one or more flow type profiles, with each profile including one or more parameter values set with respect to the expected characteristics of packet flow represented by the profile. Further, in an exemplary embodiment, each flow type profile includes a defined packet matching filter and an activity timer expiration period value. In operation, the network determines whether data packets for a given mobile station match any of the defined flow type profiles. More particularly, the network maintains an active flow set for each mobile station based on which, if any, of the flow type profiles are matched by packet data traffic for that mobile station.

Flows are added to the mobile station's active flow set as new flow type profiles are matched, while flows are removed from the active flow set upon expiration of the flow's activity timer. Receipt of packet data matching an already active flow resets that flow's activity timer, causing it to remain in the active flow set for at least as long as the expiration period of the timer, which is taken from the corresponding flow type profile. The parameter values are also taken from the flow type profiles corresponding to the flows in the mobile station's active flow set.

The network generates an application activity profile for each mobile station by deriving a combined set of resource control parameters using parameter values in the mobile station's corresponding active flow set. Where multiple active flows define different control values for the same resource control parameter, the network intelligently selects the control value that ensures proper control of the resource (s) associated with that control value. For example, where a mobile station's active flow set includes three flows each of which includes a different maximum packet latency value, such as low, medium, and high, the network would select "low" as the latency value to be used in the application activity profile for the mobile station because the "low" latency setting satisfies the maximum latency requirement of all active flows for the mobile station.

One or more network resource managers use information in each mobile station's application activity profile to control selected communication resources for the various mobile stations. Further, each mobile station's application activity profile is updated as the active flows for the mobile station change, thereby allowing the network to dynamically update resource control parameters for that mobile station. Such dynamic updating of resource control parameters allows the network to maintain a balance between efficiency with regard to communication resource utilization and perceived performance by the end users.

The underlying parameter values contained in the flow type profiles may be set using default information in the network nodes, and/or might be supplied in whole or in part by network operators as part of network configuration and maintenance operations. Additionally, the network might comprise off-line traffic analyzers that generate optimized resource control parameter values for the different types of packet data, based on, for example, employing statistical analysis of observed packet behavior developed over long term monitoring.

Regardless of how control parameter values for the flow type profiles are developed, numerous exemplary techniques may be employed for matching user packet data to the defined flow type profiles. For example, packet matching might involve varying levels of packet data inspection. For example, resource allocation may be varied depending upon whether or not given packet data traffic uses Transfer Control Protocol (TCP). Such information may be gleaned by the network based simply on identifying the port number associated with the packet data traffic. More generally, packet data filtering involves inspecting various header fields in the TCIP/IP protocols, such as information relating to Internet Protocol (IP), User Datagram Protocol (UDP), Transfer Control Protocol (TCP), and RTP. Thus, the network detects matches between the specified header information in data packets and one or more of the filters defined for the flow type profiles.

The above approach permits the network to dynamically manage resources based on determining packet data flows for communication traffic passing to or from one or more mobile stations based on packet data filtering. While the range of communication resources whose control can be tailored in dependence on user packet data types is varied, exemplary resources include, but are not limited to, radio transceiver resources and logic network resources. Thus, resource control parameters bearing on the assignment and control of communication resources, such as dormancy timers, packet latency settings, bit rate settings, and channel allocation settings, may be collectively or individually adjusted for given users based on recognizing the types of packet data being carried by the network for each user's communication device, e.g. mobile station.

DETAILED DESCRIPTION OF THE INVENTION

The present invention is applicable to a range of wireless communication network types, and thus is applicable to networks based on differing standards including, but not limited to, Wideband CDMA (WCDMA) and cdma2000 networks. Thus, it should be understood that the following discussion and accompanying drawings are exemplary only.

Figure 1:
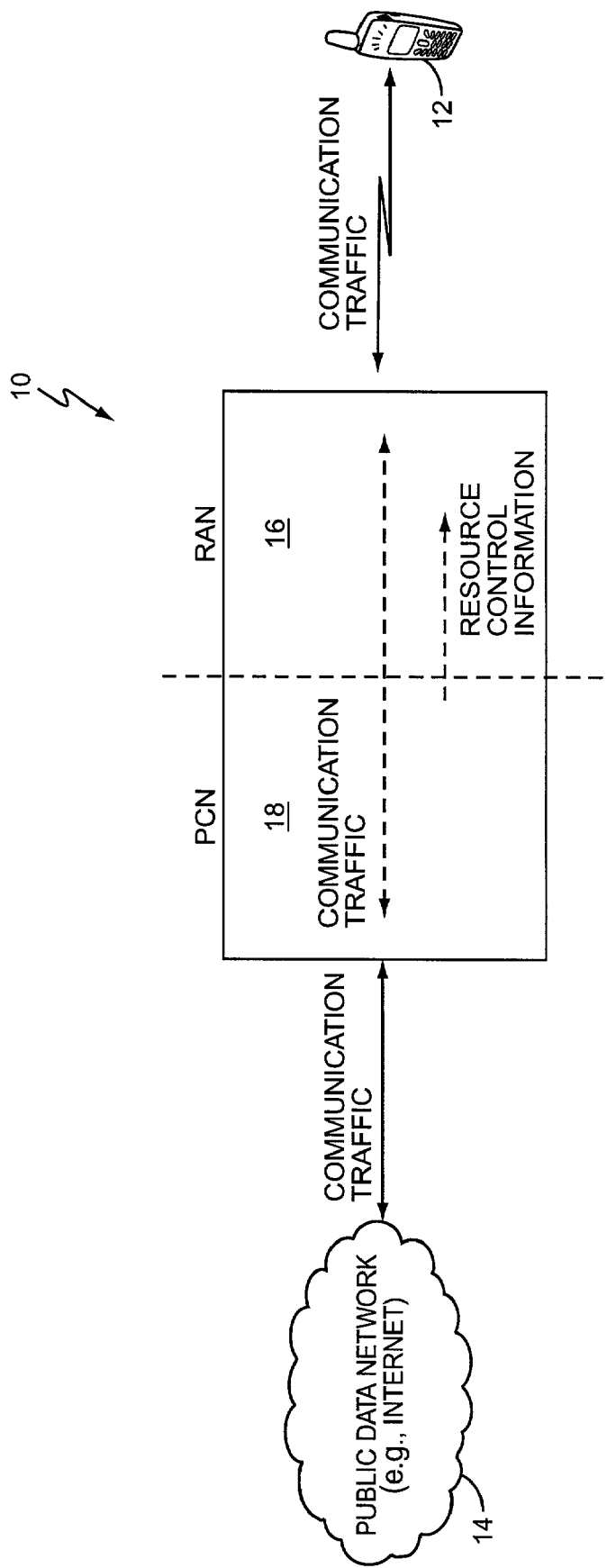
FIG. 1 is a diagram of an exemplary wireless communication network for practicing at least some embodiments of the present invention.

Turning now to the drawings, FIG. 1 illustrates a wireless communication network generally referred to by the numeral 10. Network 10 communicatively couples one or more mobile stations (MSs) 12 to one or more Public Data Networks (PDNs), such as the Internet 14. In an exemplary embodiment, the network 10 comprises one or more Radio Access Networks (RANs) 16, and one or more Packet Core Networks (PCNs) 18. Generally, the PCN 18 routes communication traffic into and out of the RAN 16, while the RAN 16 supports radio communication with MSs 12, such that communication traffic is transmitted from network 10 to MSs 12, and received at network 10 from MSs 12. Thus, in overall operation, the network 10 routes communication traffic, e.g., packet data, to and from MSs 12.

Communication traffic for a given MS 12 may originate outside the network 10, such as in the Internet 14, may originate within the network 10, such as from a given MS 12, may originate from another network user, or may originate elsewhere. Regardless of where the traffic originates, the network 10 generally carries or otherwise passes communication traffic for a plurality of MSs 12 associated with a plurality of users.

In accordance with an exemplary embodiment of the present invention, network 10 dynamically manages communication resources for a plurality of users based at least in part on the type of communication traffic carried by network 10 for one or more of those users. As such, resource control decisions made by network 10 regarding, for example, the allocation of radio channels, maximum bit rate settings, dormancy timer resource release settings, and various Quality-of-Service settings, may be made based on a user's traffic type or types. Thus, the network 10 gains efficiency by managing communication resources allocated to an instant messaging user differently than, for example, resources allocated to an email user, based on recognizing the different packet data types associated with such users.

Figure 2:
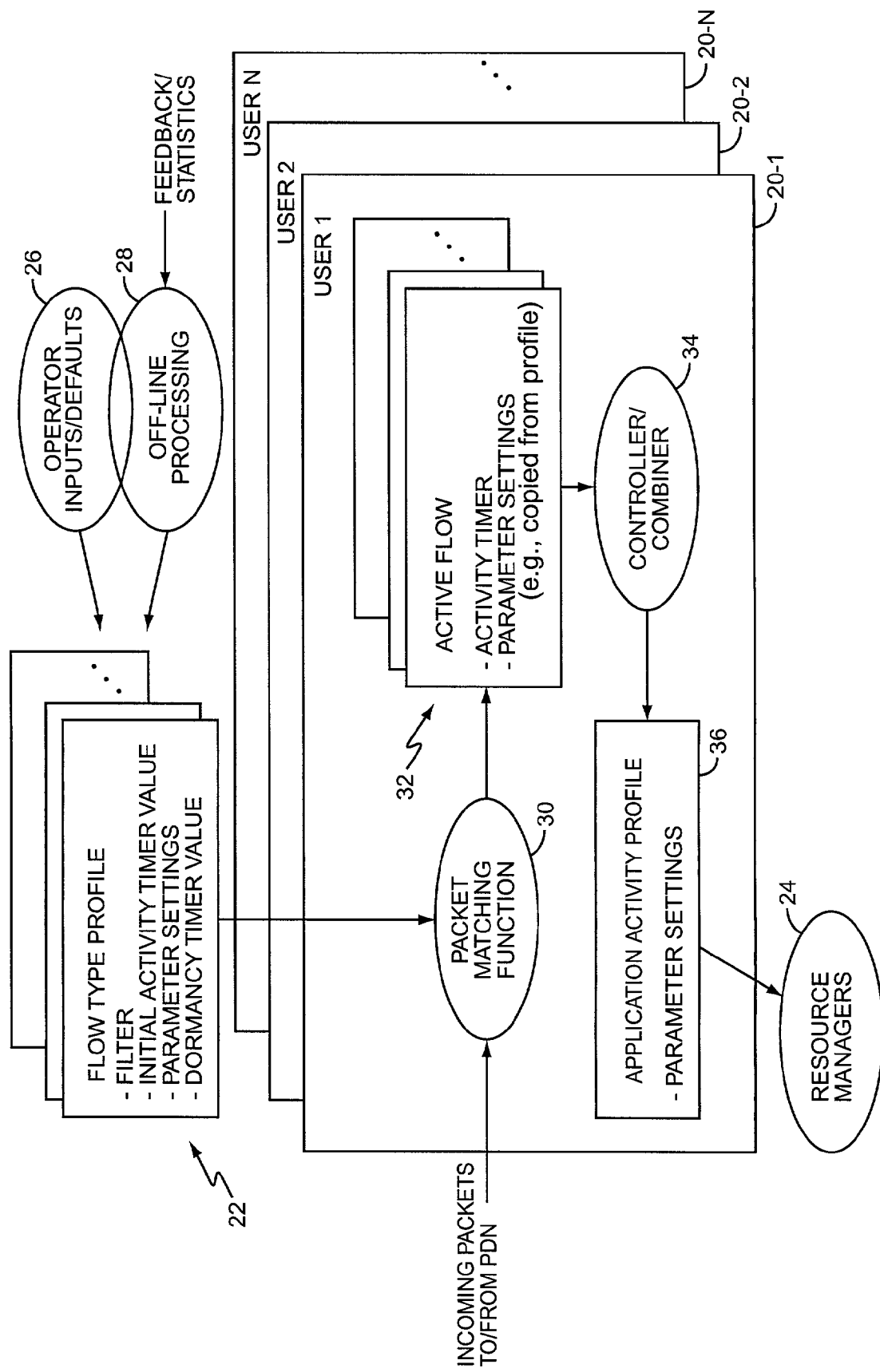
FIG. 2 is a diagram of exemplary functional elements supporting communication resource control based on packet data types.

FIG. 2 is a diagram of exemplary functional elements supporting such operations, which elements comprise individual user profiling processes 20-1, 20-2, and so on, flow type profiles 22, various resource managers 24, operator/default inputs 26, and off-line processing inputs 28. Each user's profiling process 20 logically comprises a packet matching function 30, an active flow set 32, a controller/combiner 34, and an application activity profile (AAP) 36.

With regard to the ith user, e.g., the user of the ith MS 12 supported by network 10, profiling process 20-i generates an AAP 36 for the user based on matching incoming data packets for the user to defined flow types. The AAP 36 represents a collection of one or more parameter settings to be used by one or more resource, managers 24 operating in network 10. Packet matching function 30 identifies which, if any, of the defined flow type profiles 22 are matched by data packets flowing to/from the PDN 14 for the user. Each defined flow type has a packet filter definition that provides a basis for such matching operations by packet matching function 30.

The functionality depicted in FIG. 2 is best understood by first understanding the flow type profiles 22. A given one of the flow type profiles 22 represents a model of the packet flow generated by a given type or types of communication application. That is, the behavior of an application is characterized by the packet flow of that application. Thus, there is a correspondence between flow type profiles 22 and various types of communication applications, although there may not be a one-to-one correspondence since multiple applications might exhibit the same or essentially the same flow behavior. Regardless, flow type profiles 22 serve as a global resource used in developing AAPs 36 for each user. In an exemplary embodiment, each one of the profiles in flow type profiles 22 includes filter matching criteria, an initial activity timer value, and resource parameter settings, i.e., one or more values used in the management of selected network communication resources. Each profile in the flow type profiles 22 might further include a dormancy timer value, which is a parameter used to control the value of the air interface dormancy timer, which controls the release of dedicated air interface channel resources by timing lapses in user activity.

Thus, the user's profiling process 20-*i* uses filter definition information obtained from flow type profiles 22 to identify the types of data packets being carried by network 10 for the user. Based on such real-time packet matching, the profiling process 20-*i* maintains an active flow set 32 for the user, which may be thought of as a dynamic list of all flow types that are active for the user, along with the activity timer and resource control parameters, such as a dormancy timer value, associated with each of the active flows. Packet matching function 30 operates in real-time in exemplary embodiments, matching individual data packets associated with the ith user to defined filters in the flow type profiles 22, and updating the active flow set 32 as needed on a per-packet basis.

Figure 3:
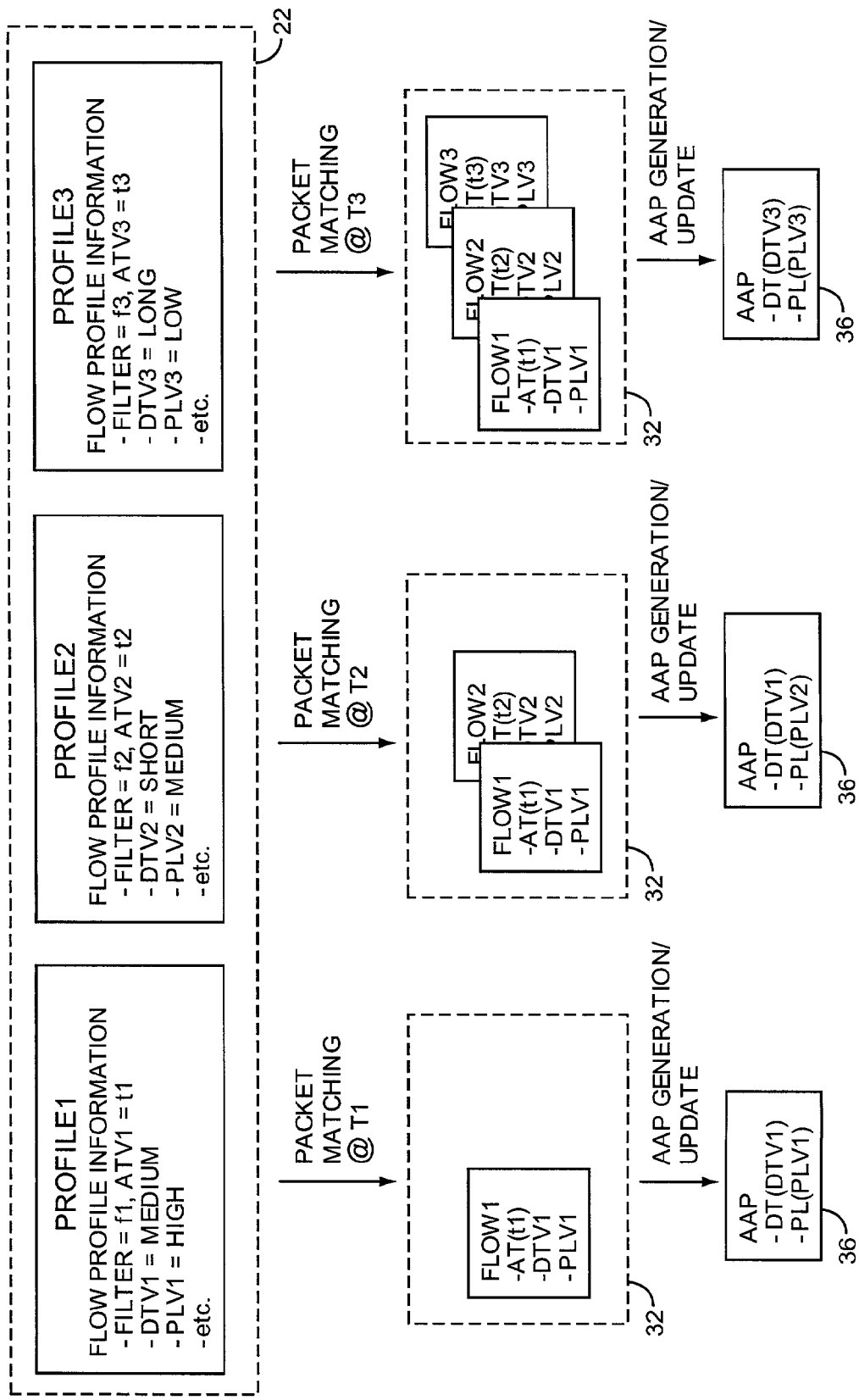
FIG. 3 is a diagram of exemplary flow processing and application activity profile operations.

FIG. 3 illustrates exemplary operation of the ith user's profiling process 20-*i*. Here, flow type profile 22 includes three flow type profiles, Profile1, Profile2, and Profile3, each having a collection of flow profile information that includes a defined packet matching filter, initial activity timer value, and one or resource control parameter values. As shown, each profile includes a dormancy timer value, DTVx, and a packet latency value, PLVx. In actual implementation, each profile will include resource control parameter values as needed, and an actual profile may include a substantially greater number of resource control parameter values associated with QoS issues, etc. Also, while the selected parameters illustrated take on qualitative settings such as "SHORT," "MEDIUM," and "LONG," those skilled in the art will recognize that resource control parameters stored in the profiles comprising flow type profiles 22 may be set according to essentially any desired scheme, including assigning real and/or integer numerical values to any or all of the parameters.

At time T1, a data packet for the ith user is matched to filter f1 in Profile1 and the corresponding flow, Flow1, is added to the user's active flow set 32. The activity timer for Flow1, AT1, is initialized to the t1 timer value taken from Profile1, and the parameter values DTV1, PLV1, etc., are added to the active flow set 32 as well. Controller/combiner 34 updates the user's AAP 36 using the parameter values in Flow1, since that is the only flow active for the user.

At time T2, a data packet for the ith user is matched to filter f2 in Profile2 and the corresponding flow, Flow2, is added to the user's active flow set 32. The activity timer for Flow2, AT2, is initialized to the t2 timer value taken from Profile2, and the parameter values DTV2, PLV2, etc., are added to the active flow set 32 as well. Assuming Flow1 remains active, the user's active flow set 32 now contains both Flow1 and Flow2. Controller/combiner 34 updates the user's AAP 36 responsive to the addition of Flow2, but now must process the aggregate set of resource control parameter values of Flow1 and Flow2 to determine the appropriate combination of parameter values for the AAP 36.

Thus, at time T1, the dormancy timer for the user, DT, was set using the expiration period DTV1 included in Flow1. Similarly, the packet latency control parameter was set to the value of PLV1 from Flow1. However, with the addition of Flow2 at time T2, controller/combiner 34 must determine whether any newly added parameters represent resource control settings that are more stringent than, or would otherwise override, current settings in the user's AAP 36. Here, controller/combiner 34 reconciles potentially conflicting parameter values between Flow1 and Flow2. More particularly, controller/combiner 34 determines that DTV1 takes precedence over DTV2 (MEDIUM dormancy time out versus SHORT dormancy time out), and that PLV2 takes precedence over PLV1 (MEDIUM packet latency tolerance versus HIGH packet latency tolerance). Controller/combiner 34 makes the same critical comparisons between any of the various remaining resource control parameters in Flow1 and Flow2 and updates the AAP 36 accordingly.

At time T3, a data packet for the ith user is matched to filter f3 in Profile3 and the corresponding flow, Flow3, is added to the user's active flow set 32. The activity timer for Flow3, AT3, is initialized to the t3 timer value taken from Profile3, and the parameter values DTV3, PLV3, etc., are added to the active flow set 32 as well. Assuming Flow1 and Flow2 remain active, the user's active flow set 32 now contains both Flow1 and Flow2. Controller/combiner 34 updates the user's AAP 36 responsive to the addition of Flow3 consistent with the above logical operations. That is, controller/combiner 34 forms the aggregate set of resource control parameter values to be used in AAP 36 based on determining which ones of the parameters duplicated in two or more of the active flows take precedence. Note that non-duplicated parameter values, i.e., those appearing in only one active flow, may simply be added as needed to the AAP 36.

Here, the dormancy timer value for Flow3, DTV3, is LONG and therefore takes precedence over the MEDIUM and SHORT values of DTV1 and DTV2 from Flow1 and Flow2, respectively. Similarly, the packet latency parameter value for Flow3, PLV3, is LOW, and therefore takes precedence over the HIGH and MEDIUM values of PLV1 and PLV2 from Flow1 and Flow2, respectively. Thus, controller/combiner 34 updates the user's AAP 36 such that the user's dormancy timer expiration period is controlled by the DTV3 value, and the packet latency value is controlled by the PLV3 value. Of course, the user's AAP 36 contains potentially many other resource control parameter values taken from the various flows active in active flow set 32.

In general, then, exemplary operations of controller/combiner 34 involve selection of the "best" or most restrictive parameter value for parameter values common between two or more flows in each user's active flow set 32 for use in the user's AAP 36. Information in the AAP 36 then serves as a basis for resource control operations performed by the various resource managers 24 operating in network 10.

In terms of defining individual profiles in the flow type profiles 22, the network 10 may permit the network operator to define and/or update flow type profile information as part of ongoing network management operations. Default flow type profile information may also be stored by network 10 for common flow type profiles corresponding to the most frequently used applications. Such default information might be initially loaded by network 10 and then made available for refinement by the network operator. Flow type profiles 22 might also be derived from or adjusted using off-line parameter inputs developed over time based on off-line analysis of packet flows for the various types of traffic passing through network 10.

Note that in an exemplary embodiment, a default profile may be defined in flow type profiles 22, wherein the default profile includes an "any match" filter such that essentially all types of packet data match its generic filter definition. In this manner, the default profile can be configured with resource control parameter values to be used by network 10 when a given user's packet data does not match any of the specifically defined flow profile filters. Thus, the AAP 36 of a mobile station whose data does not match any of the specially defined flow profiles would have its AAP 36 populated with the default resource control parameter values from the "any match" default flow profile in flow type profiles 22. Of course, default resource control parameter values may be initialized and used for mobile stations without use of an "any match" profile.

Figure 4:
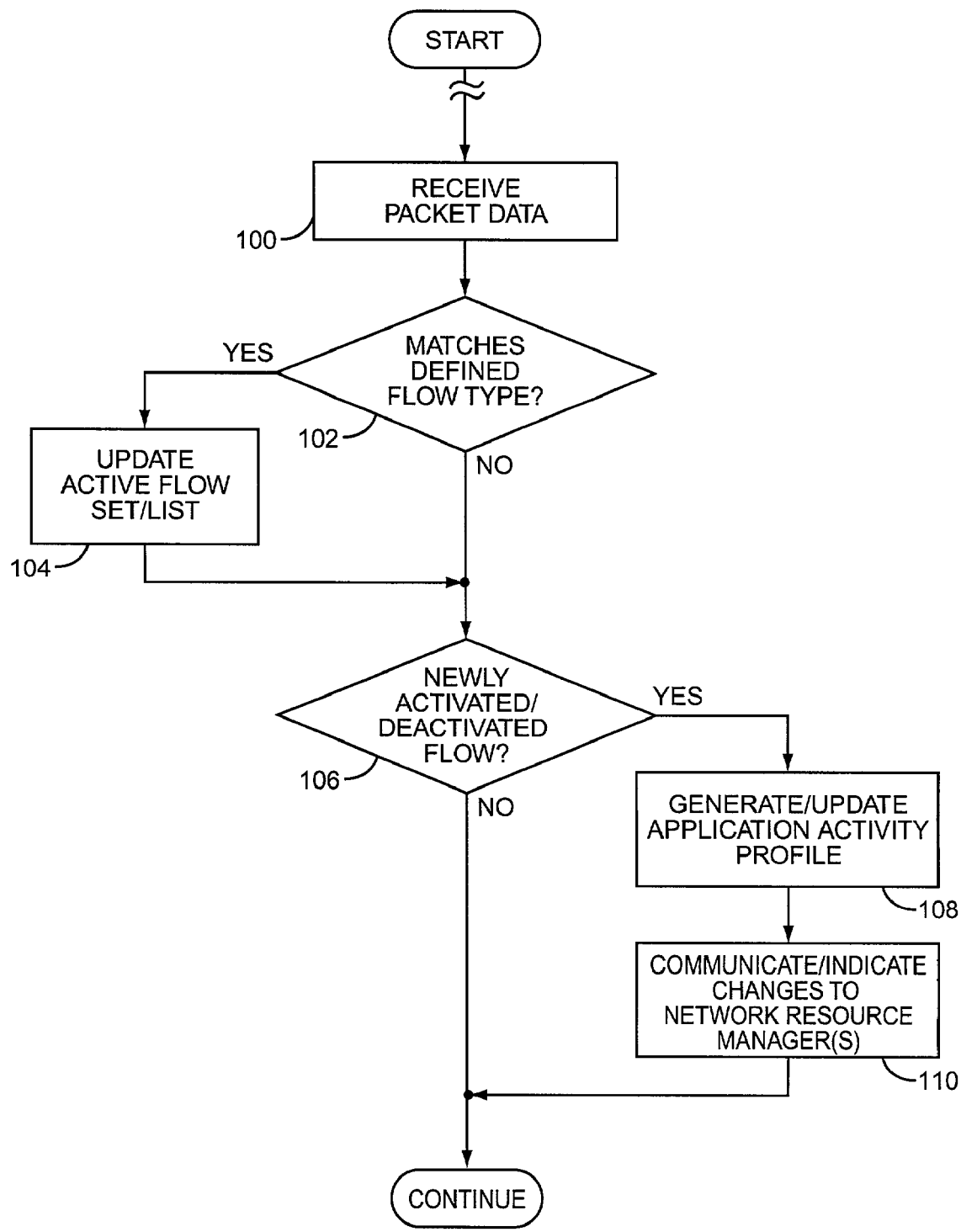
FIG. 4 is a diagram of exemplary logic for the functional elements of FIG. 2.

FIG. 4 is a diagram of exemplary flow logic associated with the functional elements of FIG. 2. For the ith user, processing begins with receipt of a data packet associated with that user (Step 100). As before, the data packet might originate from PDN 14 or be destined for delivery to PDN 14. Packet matching function 30 determines whether the packet matches any of the filters defined in the flow type profiles 22 (Step 102). The user's active flow set 32 is updated if the packet matches a defined flow type (Step 104).

If the packet represents a new flow type for the user, that is, if the flow for that packet type is not already active in the user's active flow set 32, the active flow set 32 is updated to include the new flow. In other words, the new flow is "activated" for the user such that the user's active flow set 32 includes the new flow, and its associated activity timer and resource control parameters. If the packet matches a currently active flow, updating the user's active flow set 32 might simply comprise re-activating that flow by resetting the activity timer of that flow.

In an exemplary embodiment, then, activity timers provide a basis for managing the active flows within the user's active flow set 32. When a packet matches a defined flow type, the flow is newly activated in the user's active flow set 32, or is reactivated by resetting that flow's activity timer. When the activity timer of an active flow expires, that flow is removed from the user's active flow set 32. Thus, the use of activity timers allows flows to be added and deleted from the active flow set 32.

The activity timer for each flow defined in flow type profiles 22 has an expiration period that generally is matched to the expected behavior of packets associated with that flow type. For example, a given flow type might correspond to one or more communication applications characterized by significant intermittency. Web browsing exemplifies such an application, where a user engaged in Web browsing downloads a page and peruses its contents for some time before clicking another page link. As such, the activity timer expiration period for the flow type corresponding to Web browsing should be long enough to account for reasonable browsing delays. That is, once a flow associated with Web browsing for a given user is activated in the user's active flow set 32, it should not be prematurely deactivated.

In general, then, an active flow set 32 may be maintained for each user based on assigning timer expiration periods to each active flow in the set that correspond to the expected behavior of that flow. When a flow is activated, its corresponding activity timer starts, and while the flow is active, receipt of additional matching packets causes resets that timer. Without any such resets, the timer expires at the end of its defined expiration period and the flow is deactivated, i.e., removed from the user's active flow set 32.

As an alternative to the use of activity timers, or perhaps to augment their functionality, the network 10 might activate and deactivate flows in the users' active flow sets 32 based on flow type matching operations. For example, certain flows might have defined end-of-flow or flow termination data packets that can be recognized by network 10 and used to deactivate the corresponding flow for the affected user. Packet matching might also be used in the sense that certain types of packet flows are exclusive with respect to other types. Hence, the ith user's active flow set 32 might be managed with regard to activation and deactivation of active flows within the set based on recognizing that the activation of one flow type implies the deactivation of another flow type.

In any case, adding (activating) or removing (deactivating) a flow potentially changes the desired controlling value for one or more resource control parameters, thus the controller/combiner 34 monitors such activity to determine when flows are activated and deactivated (Step 106). If such action occurs, the controller/combiner 34 generates a new AAP 36, or, more generally, updates the information in the current AAP 36 to reflect any parameter changes associated with the activation or deactivation. Such changes, if any, may then be communicated to the various network resource managers 24 (Step 110), and packet-matching processing continues by, for example, returning to Step 100 for the user.

Those skilled in the art will recognize that the above exemplary processing generally is carried out in parallel for the plurality of users supported by network 10, and typically comprises only a portion of overall communication processing performed by network 10. Further, the above processing may be distributed over one or more entities operating within network 10 and, as such, may be carried in on the RAN 16, the PCN 18, or in some combination thereof.

As regards the details of packet matching, network 10 might adopt one or more exemplary approaches. In an exemplary embodiment, network 10 matches packets associated with a given user against the filters defined in flow type profiles 22 to determine whether the individual packets match any of the defined packet data filters in flow type profiles 22. Note that a given data packet may match more than one packet data filters, i.e., a data packet may match two or more profiles defined in flow type profiles 22, and thereby activate multiple flows. In an exemplary embodiment, the matching filters are built up by looking at various header fields in TCP/IP protocols, such as IP, UDP, TCP and RTP. If specific header fields of an incoming packet matches the values specified by a filter, there is a match and the corresponding flow is considered active. Examples of valid filters include, but are not limited to, the following definitions:

TCP portnumber=110 (The email protocol POP3)
UDP portnumber=25 (The email protocol SMTP)
TCP portnumber=80 and IP destination address (uplink) =135.23.34.45 (HTTP communication with the server 135.23.34.45)
UDP port number=554 and DSCP=xx (RTSP—a protocol for streaming, DiffServCode Point in IP header set to xx)

The Internet Assigned Numbers Authority (IANA) maintains comprehensive port number assignment information at its Web site, iana.org/assigments/port-numbers.

In some instances, network 10 might use combined filters to detect activities associated with certain types of applications. For example, email applications generally involve the use of multiple protocols. Thus, packet data traffic associated with an email application might match several defined filters. Network 10 may base its management of resources for that packet data based on simple matching of one or more filter definitions without attempting to ascertain the particular application being used. For example, the flow associated with a given filter match might provide a sufficient basis for resource management, or the network 10 might recognize the particular set or pattern of flows activated by given packet data traffic as corresponding to a particular application. From that evaluation, the network 10 might make more detailed decisions regarding resource management.

Figure 5:
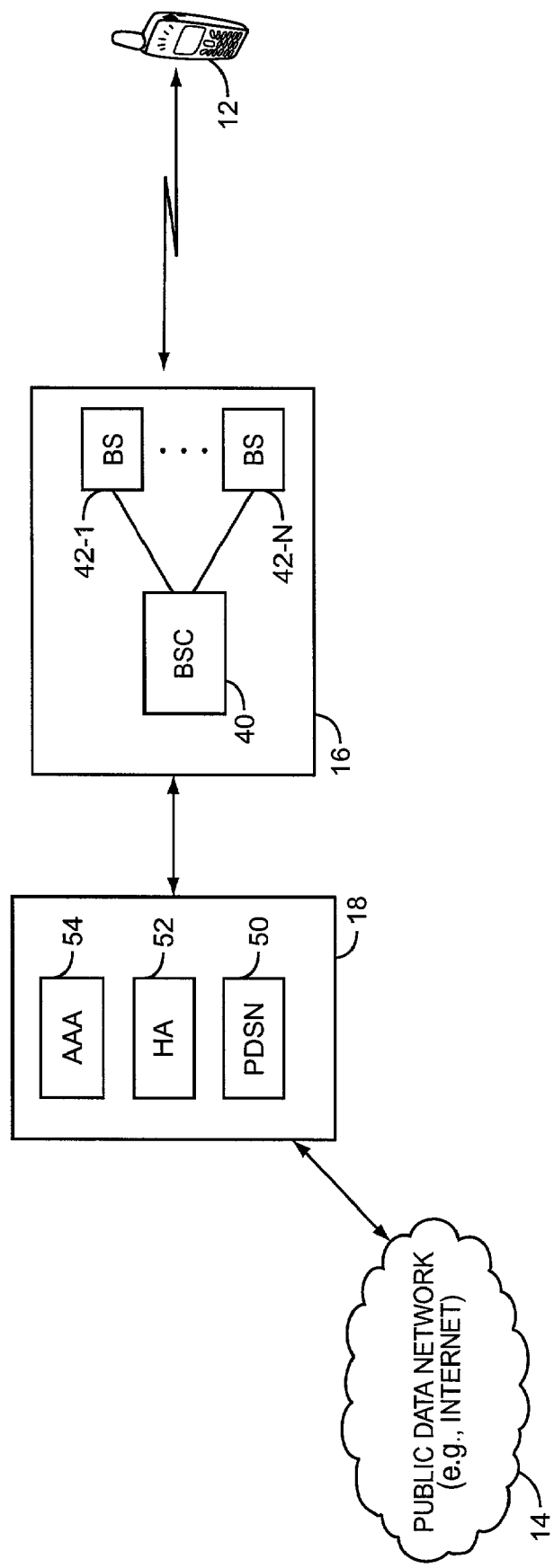
FIG. 5 is a diagram of exemplary network entity details.

FIG. 5 illustrates exemplary network entity details for network 10, where such entities provide a context for implementation of the present invention. Here, the RAN portion of network 10 comprises one or more Base Station Controllers (BSCS) 40, each having one or more associated Base Stations (BSs) 42, i.e., 42-1, 42-2, and so on. In some network architectures, the BSs 42 are referred to as Radio Base Stations (RBSs) or Base Transceiver Systems (BTSs), while other architectures use differing terminology. In any case, BSs 42 provide radio resources supporting wireless communication with the MSs 12. That is, each BS 42 typically comprises radio transceiver resources such as baseband processors, modulators, and power amplifiers for transmitting communication traffic and control signaling to MSs 12, and further comprise receivers, demodulators, and baseband processors for receiving communication traffic and control signaling from MSs 12. Of course, the particular details and architecture of radio resources implemented in BSs 42 depends on the specific network type.

In turn, the PCN portion of network 10 comprises a Packet Data Serving Node (PDSN) 50, a Home Agent (HA) 52, and an Authentication, Authorization, and Accounting (AAA) server 54. The PCN 18 as illustrated adopts terminology common to certain CDMA-based networks, such as those networks based on cdma2000 standards. Other nomenclature may be used to describe the same or similar functional organization in other network architectures. For example, in a General Packet Radio Service (GPRS) network, the PCN 18 might comprise a Serving GPRS Support Node (SGSN), which provides packet data connectivity between the RAN 16 and a Gateway GPRS Support Node (GGSN), which acts as a gateway router providing Global Services for Mobile (GSM) communication connectivity to external networks such as the PDN 14.

Regardless, when a given user, i.e., a given MS 12, establishes a data connection with the network 10, the network 10 allocates selected resources, including select radio resources, to support the data connection. For example, the network 10 might allocate specific radio transceiver resources in one or more BSs 42 for use in supporting the user's data connection. Of course, other resources at various entities within network 10 are allocated to support the data connection, such as logical routing resources for routing the user's communication traffic into and out of network 10. Once the user gains allocation of such resources, network efficiency and the overall ability to serve the greatest possible number of users depends on the efficient control and timely release of such resources so that the released resources become available for reallocation.

Figure 6:
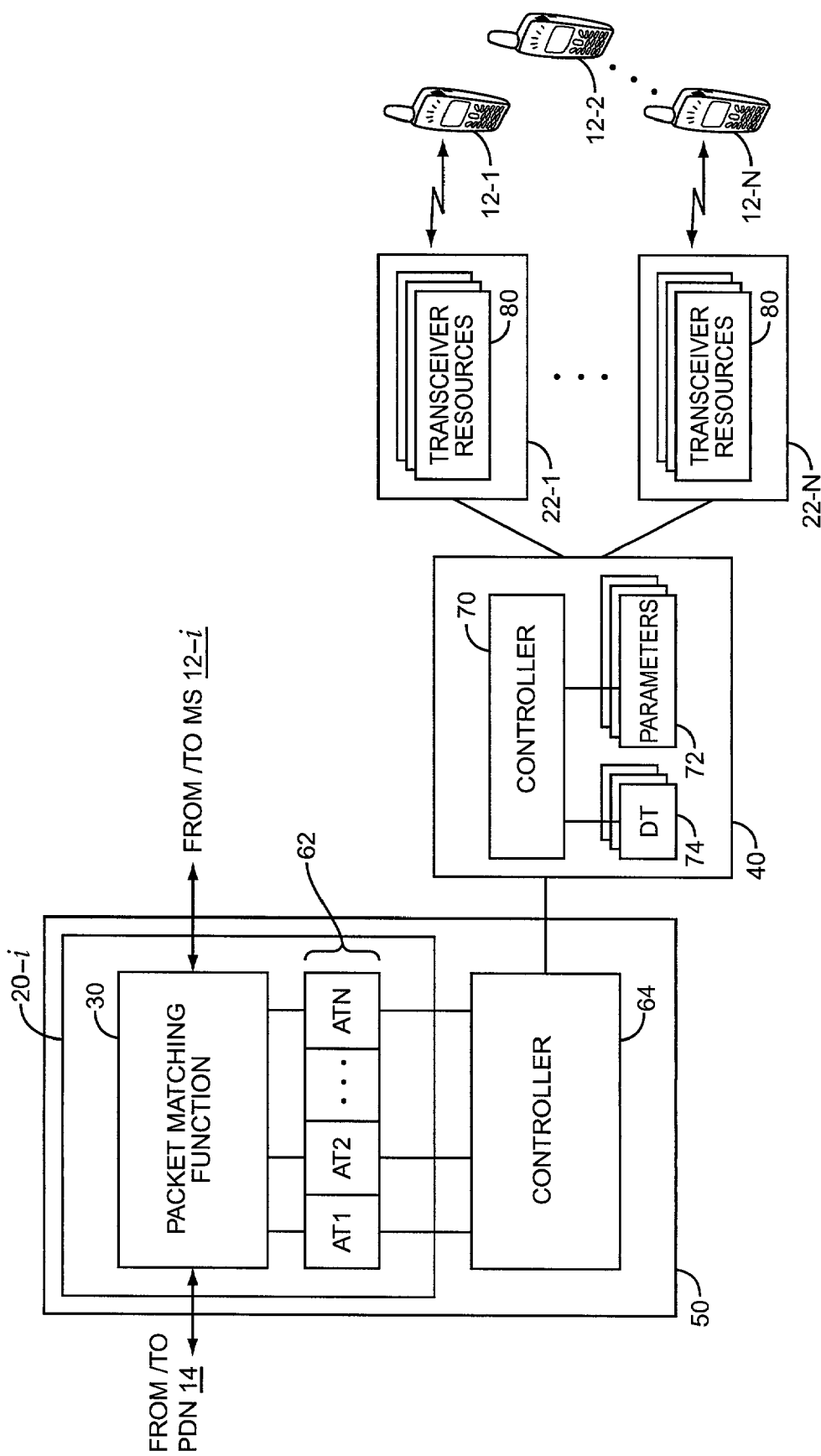
FIG. 6 is a diagram of additional exemplary network entity details, including an exemplary activity timer implementation.

FIG. 6 illustrates an exemplary implementation of flow type-based resource control, wherein PDSN 50 implements at least a portion of the functionality supporting such operation. Here, PDSN 50 implements profiling processes 20 for the plurality of network users, e.g., users of MSs 12-1 through 12-N. Profiling process 20-*i* is illustrated for the ith user. As before, profiling process 20-*i* includes packet matching function 30, and the activity timers associated with the user's active flow set 32, which timers are shown here as a set of activity timers (ATs) 62, individually denoted as AT1, AT2, and so on. The number of ATs 62 running in the user's active flow set 32 depends on the number of flows active for that user. A controller 64 operates as controller/combiner 34, and may support profiling operations for the plurality of users, as well as supporting other communication functions at PDSN 50.

BSC 40 also includes a controller 70, which may actually comprise one or more processing systems executing processing instructions in support of BSC operations. In an exemplary embodiment, the PDSN 50 transfers each user's AAP 36, or relevant parameters therein, to the BSC 40 for use in RAN resource control. Thus, one or more of the resource managers 24 generally reside in the RAN 16, and functionally may be implemented in BSC controller 70. As such, controller 64 in PDSN 50 passes the AAP 36 for a given user to controller 70 in BSC 40 whenever that AAP 36 is updated, or passes indicator flags denoting relevant AAP changes. Alternatively, or in addition to such change-based transfer, the BSC 40 might perform scheduled polling or reading of AAP details for the various users it supports.

In any case, in exemplary embodiments, controller 70 maintains relevant stored resource control parameters 72 for each user based on flow type matching operations performed by the PDSN 50. Controller 70 further maintains a dormancy timer (DT) 74 for each user to time user inactivity for purposes of timely releasing resources upon a given user's data connection becoming inactive. Generally, controller 70 maintains the DTs 74 and transceiver resources 80 in the BSs 22 based on the AAPs 36 associated with the various users. With this approach, the AAP 36 for a given user might include a dormancy timer value selected by controller/combiner 34 from the dormancy timer values appearing in the user's active flow set 32 corresponding to the different flows active for the user.

In actuality, resource release might involve several levels of release. For example, radio resources supporting dedicated channels, such as forward and reverse link traffic channels, might be released after a first inactivity delay, while selected network routing resources allocated for transporting user traffic within the network 10 might be released after a second inactivity delay. In this manner, scarce resources, such as the limited radio resources, might be released the earliest. Of course, other reasons exist for staging resource release. For example, certain higher level communication traffic routing connections for a given user, such as those between the RAN 16 and the PCN 18, or within the PCN 18, might be preserved for time even after the release of the underlying radio resources, to minimize network signaling should the user desire a resumption in communication. An example of this would be the preservation of a Point-to-Point Protocol (PPP) connection between the PDSN 50 and a given MS 12 for some time after transceiver resources 80 are released for that MS 12.

In exemplary dormancy timing, the DT 74 for a given user is maintained based on the user's AAP 36. For example, assume the user has three active flows in his or her flow set 32, each having a different dormancy timer value. Controller 64 examines the user's active flow set 32 to determine the greatest dormancy timer value appearing in it, and communicates that value to the BSC 40, or otherwise transmits an indication of what dormancy timer value should be used for the user's DT 74. In response to such communication, controller 70 sets the user's DT 74.

In general, then, each user's DT 74 is set based on the greatest one of the expiration periods (dormancy timer values) appearing in the user's active flow set 32, with that flow set updated as needed based on ongoing packet matching by packet matching function 30. In this manner, dormancy timing for each user changes based on recognizing the flow types active for that user. As such, email users, Web browsing users, instant messaging users, and others, may all be treated differently with respect to dormancy timing resource release.

Figure 7:
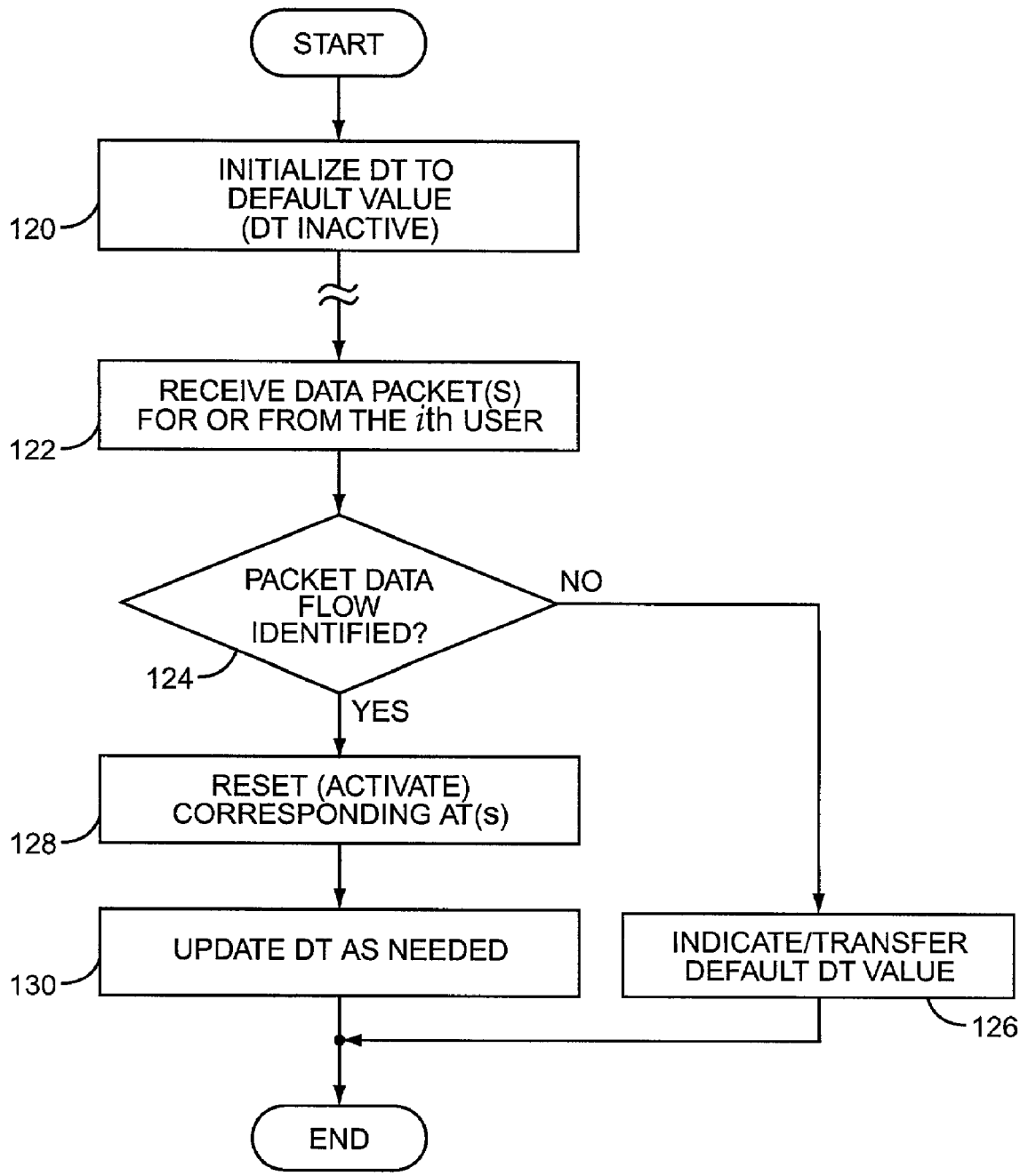
FIG. 7 is a diagram of exemplary activity timer management.

FIG. 7 illustrates an exemplary logic flow for dormancy timing. Processing begins for a given user with the network 10 initializing the user's DT 74 to a default value (Step 120). The network 10 receives packet data for the user (Step 122), and performs packet matching as disclosed above (Step 124). If the packet data does not match any defined flow type and default timer information is not already available in BSC 40, the PDSN 50 can transfer a default expiration period for dormancy timing, or simply transfer a flag indicating that the BSC 40 should use a default expiration period for the user's DT 74 (Step 126).

If given packet data matches a defined filter or filters, network 10 considers the flow or flows corresponding to those filters as active, and therefore activates those flows in the user's active flow set 32, thereby activating the activity timers, ATs 62, associated with those flows (Step 128). The activation of a new flow or the deactivation of an existing flow in the user's active flow set 32 generally adds or removes a dormancy timer value to the flow parameters held in the active flow set 32. For example, activating a flow generally adds the dormancy timer value defined in flow type profiles 22 to the parameter list in active flow set 32. Thus, controller/combiner 34 generally examines the dormancy timer values in the active flow set 32 responsive to updates and determines whether the dormancy timer value in the user's AAP 36 should be updated. Updated dormancy timer values may then be transferred from PDSN 50 to BSC 40 as needed, or corresponding flags may be passed to the BSC 40 (Step 130).

Figure 8A:
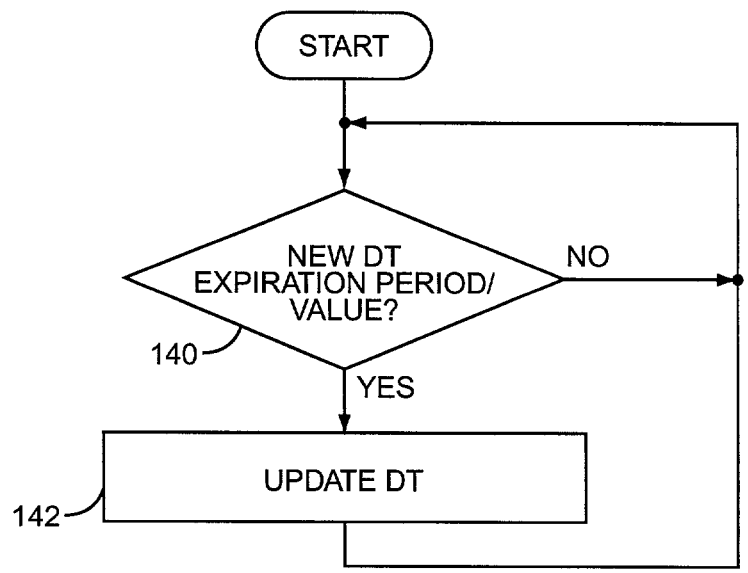
FIGS. 8A and 8B are diagrams of exemplary dormancy timing based on activity timers.

FIG. 8A illustrates exemplary dormancy timing logic for BSC 40. Assuming initial or ongoing communication for a given user, BSC 40 receives updated dormancy timer information from the PDSN 50 based on the user's AAP 36 (Step 140). If such information is received, BSC 40 updates the user's DT 74 (Step 142). As noted, if no such information is received, the user's packet data has not been matched to any defined flow, and the BSC 40 can simply use default dormancy timing for the user.

Figure 8B:
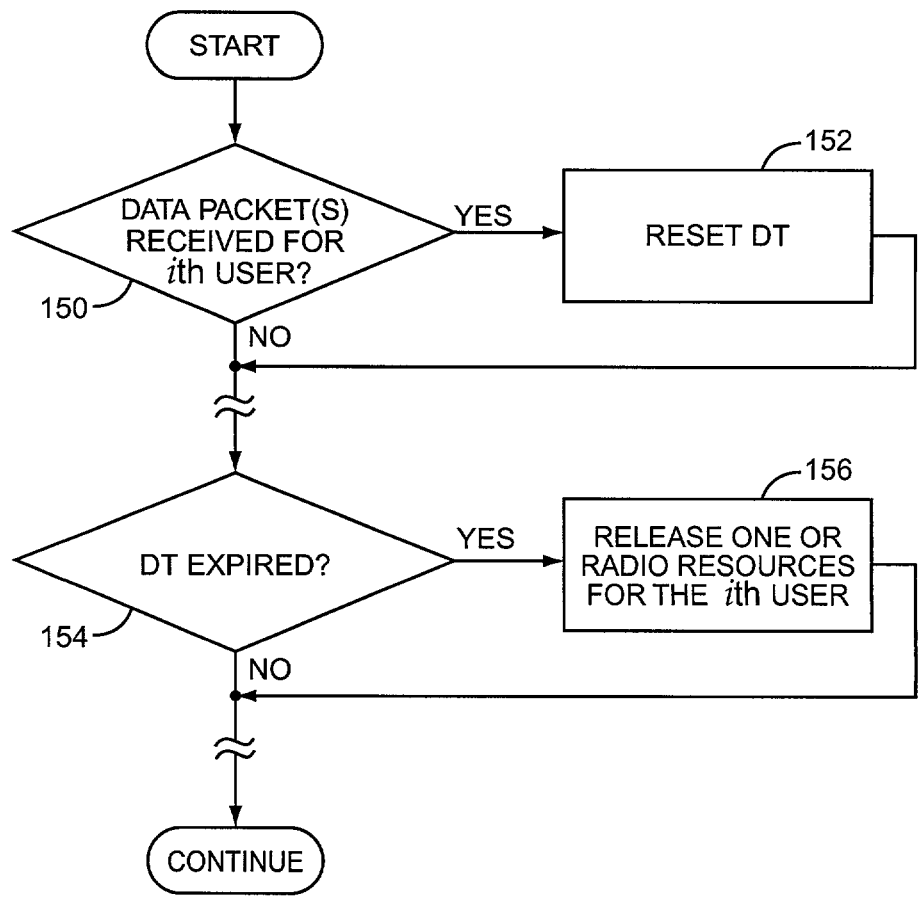

FIG. 8B illustrates exemplary resource management in association with dormancy timing for a given user. Processing begins with the network 10 determining whether any new packet data has been received for the user (Step 150). If packet data is received, BSC 40 resets the user's DT 74 such that the expiration timeout begins anew (Step 152). If no packet data is received within the DT's expiration period, DT 74 expires. If DT 74 is expired (Step 154), network 10 releases one or more resources, such as radio resources, allocated to the user (Step 156). If DT 74 is not expired, processing continues.

In one exemplary embodiment, each user's DT 74 might be set based on the values of the activity timers, ATs 62, active in the user's active flow set 32. With this approach, the longest expiration period from among the activity timers running in that user's active flow set 32 can be used to update or set the user's DT 74. Rather than simply using the longest defined activity timer expiration period, the user's DT 74 might be set based on the longest unexpired activity timer value. Using activity timer expiration periods to set the expiration period of each user's DT 74 in this manner can avoid the need for defining separate dormancy timer expiration values in the flows defined by flow type profiles 22.

In more detail, an exemplary arrangement for managing the DT 74 for the ith user based on the above approach might include the following logic:

set the value of DT 74 to a default expiration period if no packet types are matched, or if filtering has not yet begun for the user; and reset/start the expiration period of the corresponding activity timer ATx in the user's active flow set 32 upon receipt of packet data matching the corresponding defined flow type; and set DT 74 for the user to the expiration period (or actual value) of the active activity timer having the longest expiration period, which timer serves as a "controlling activity timer"; and upon expiration of the controlling activity timer, determine if any other activity timer is active and, if so, pick a new controlling activity timer and set the user's DT 74 accordingly; and upon expiration of all activity timers for the user, allow DT 74 to expire accordingly and begin resource release.

Of course, those skilled in the art will recognize that the above logic represents one of many approaches, and that use of active flow sets 32 and AAPs 36 enables a variety of approaches to resource management and substantial flexibility as regards activity timing.

Figure 9:
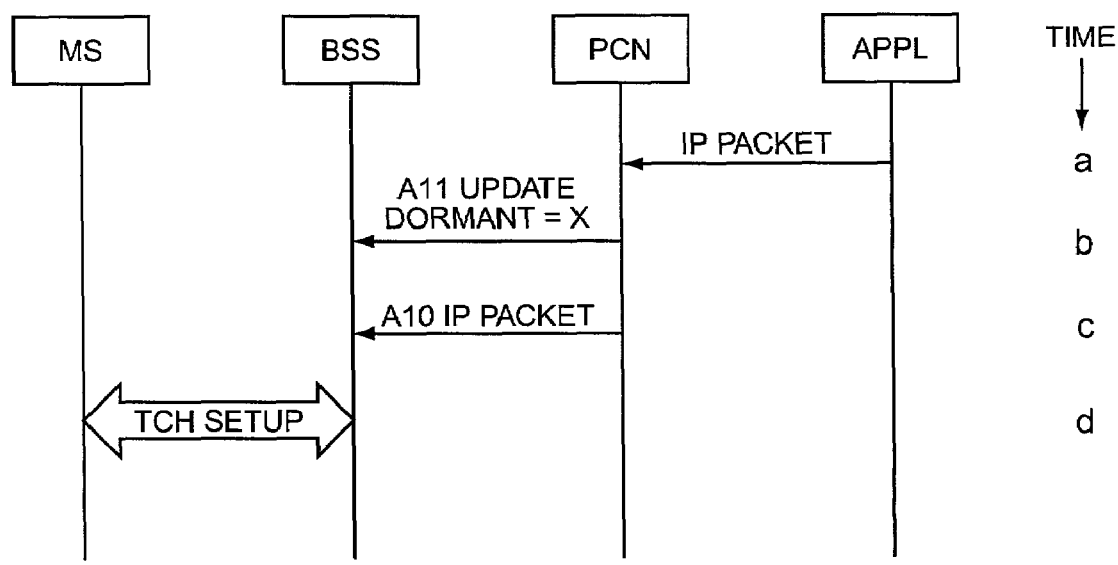
FIG. 9 is a diagram of exemplary network-initiated dormant-to-active mobile station transitioning.

FIG. 9 illustrates an exemplary use of dormancy timing in the context of mobile-terminated packet traffic in a scenario where network 10 initiates the transition of a given MS 12 from inactive to active. Call flow processing includes these steps:

(a) An IP packet is received by the PCN 18 for MS 12. The PCN 18 performs filter matching on the packet, and determines whether the packet is associated with any defined flows. If so, the network 10 begins dormancy timing based on the dormancy timer value defined by the matched flow.

(b) If the value of the dormancy timer for the matched flow is higher than the value previously associated with the Radio-Packet session between PCN 18 and RAN 16, an update is sent from PCN 18 to RAN 16 to update DT 74 accordingly. For initialization, such updating might involve the PCN 18 providing the BSC 40 with non-default dormancy timer value for use as the expiration period of DT 74 based on the matched flow. In an IS-2000 wireless network, for example, such updated expiration period information may be set via an A11 signaling message from the PDSN 50 to BSC 40.

(c) The IP packet or packets are sent to BSC 40.

(d) The traffic channel(s) associated with the user are used to transfer the packet data to the user's MS 12.

Figure 10:
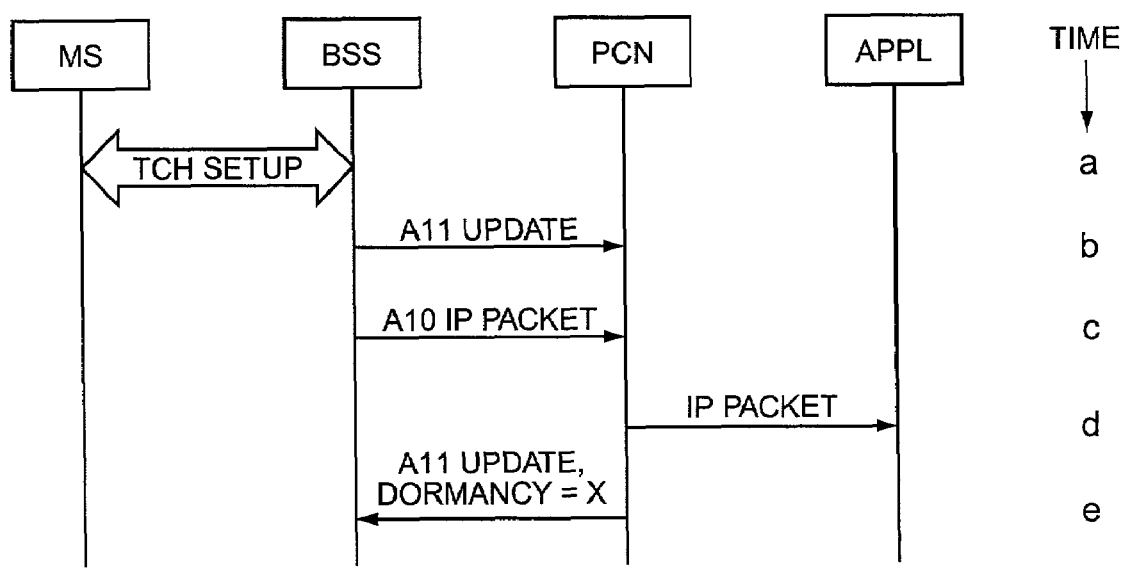
FIG. 10 is a diagram of exemplary mobile-initiated dormant-to-active mobile station transitioning.

FIG. 10 illustrates exemplary mobile-initiated transition from a dormant to an active state. Exemplary call flow processing includes these steps:

(a) A given MS 12 sends network 10 an origination message and the network 10 allocates a traffic channel or channels to the MS 12.

(b) A standard message exchange between the PCN 18 and RAN 16 activates the R-P link between the packet and radio portions of network 10. For example, a standard Interoperability Standards (IOS) A11 message may be sent to establish the link.

(c) IP packet data from MS 12 is sent from the BSC 40 to the PCN 18.

(d) The PCN 18 then routes the packet data on to the PDN 14 (e.g., Internet or other network destination).

(e) An A11 message is sent from PCN 18 to RAN 16 to update the dormancy timer expiration period active in the RAN 16 based on the flows matched by the outgoing traffic.

Thus, dormancy timing control via PCN-based packet type matching may be applied to incoming (mobile-terminated) traffic as well as outgoing (mobile-originated) traffic. Exemplary flow type profile information might comprise the following filters (fx) and corresponding dormancy timer expiration periods (tx):

filter f1 configured to recognize Instant Messaging, Positioning Applications, etc., and t1=four seconds;

filter f2 configured to recognize general Web sessions, and t2=forty seconds;

filter fd configured as a default "any match" filter, and td=twenty seconds.

In the above context, each defined flow in flow type profiles 22 has an associated activity timer value and dormancy timer value. When packet matching function 30 identifies one or more packets associated with a given user as matching one of the defined flows, that flow is added to the user's active flow set 32. Adding the flow to active flow set 32 starts an activity timer, e.g., one of the ATs 62, with its expiration period set on the associated activity timer value, and also adds matched flow's parameters, including the associated dormancy timer value, to the parameter lists contained in the active flow set 32.

Each AT 62 generally has two states: active and inactive. Where there is packet data activity matching a defined filter, the corresponding activity timer is active, meaning that matching packet data was received within the last tx seconds (where tx indicates the expiration period for the matched activity timer). If no matching packet data for filter fx is received within the corresponding tx expiration period, the activity timer for that filter expires.

In addition to exemplary dormancy timing control, network 10 may make a host of other resource control decisions based on user traffic type. Thus, the RAN 16 can optimize or otherwise adjust its internal algorithms and/or other resource control operations based on each user's AAP information. That is, if RAN 16 is provided with knowledge of the character of the applications that a given user is currently using, it can strike a desired balance between resource utilization and end user perception of application performance. Items that provide a basis for resource control at the RAN 16 include, but are not limited to, the following details:

the benefit, if any, of allocating a maximum bitrate to any of the user's current applications, as such knowledge can be used to better determine when to trigger the establishment of a supplemental channel or configure a higher data rate channel;

the delay that should be observed before deallocating selected resources supporting a data connection that has become inactive;

the delay sensitivity of an application, which might be expressed as a value for input to user scheduling algorithms, etc.;

the bitrate needed by an application; and the relative burstiness of the packet data traffic, which indication might be used for a variety of resource control purposes.

Thus, the RAN 16 might maintain various control and configuration settings that are selectively activated or used based on each user's AAP 36.

Figure 11:
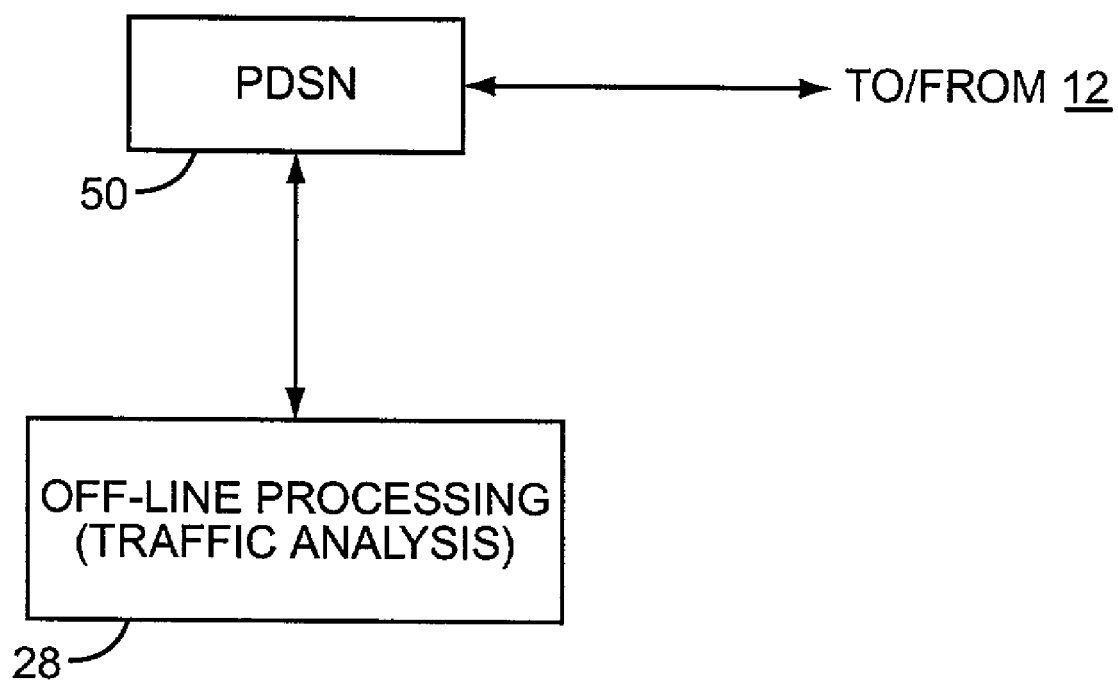
FIG. 11 is a diagram of exemplary off-line development of packet type activity profiles.

As suggested in the above logic, the PDSN 50 may, for a given user, transfer that user's AAP 36 to the BSC 40, or may transfer associated flags or other indicators such that the BSC 40 can determine the relevant AAP information. This latter approach may reduce the amount of data passing between the PCN 18 and the RAN 16. Regardless of how AAP information is managed within network 10, the various resource control parameters defined in the flow type profiles 22 can be based on or enhanced by the use of the earlier illustrated off-line parameter inputs 28. FIG. 11 illustrates an exemplary embodiment of off-line parameter development.

An off-line processing system (traffic analyzer) 28 is communicatively coupled to PDSN 50, or otherwise coupled to PCN 18. Over time, the traffic analyzer 28 can, based on statistical analysis of observed traffic behavior, develop optimized resource control settings, such as optimal dormancy timing, for the various types of packet data traffic. Such optimized parameter values may then be stored as off-line parameter inputs, and made available for direct loading into network 10 and/or made available to the network operator for use in configuring the operator/default parameter inputs 26.

With off-line processing, the network 10 can develop detailed flow profiles for observed packet data flows, and then update resource management, configuration, and control information based on those observations. As such, traffic analyzer 28 may, from time to time, feed back flow-specific resource management settings for use in managing active packet data traffic. With such operation, the network 10 updates resource management settings responsive to receiving updated settings from traffic analyzer 28. In this sense, the network 10 can actively manage its resources based on flow profile information that evolves over time, such that resource management becomes progressively more optimized.

Whether or not offline parameter development is employed, the present invention enables dynamic management of communication resources, such as dedicated physical radio resources, based on identifying the packet types of communication traffic passing through the network for each user. In general, resource managers 24 might be implemented in one, two, or possibly many of the various entities comprising network 10. Where various entities are involved in the management of communication resources, such entities might cooperatively process selected control information included in the various users' AAPs 36. Thus, BSC 40, BSs 42, and PDSN 50 might each operate as one of the resource managers 24, with each processing the AAPs 36 as needed to conduct ongoing communication resource management for the various users.

Regardless of the specific implementation details, the present invention enables dynamic management of the communication resources allocated to each user in a manner that balances network efficiency and utilization goals with user-perceived network performance. Optimizing resource control in this manner is enabled based on identifying the packet types associated with the communication traffic of each user, and then basing resource control on the identified packet types. That is, the resource control for each user complements the traffic type(s) of that user. As such, the present invention is not limited by the above exemplary details, but rather is limited only by the following claims and the reasonable equivalents thereof.

What is claimed is:

1. A method of managing communication resources in a wireless communication network, the method comprising:

maintaining a parameter set for a mobile station, said parameter set including one or more resource control parameters used by the network to manage selected communication resources in the network;

identifying types of packet data carried by the network for the mobile station; and setting values for one or more of the resource control parameters in the parameter set based on the identified types of packet data.

2. The method of claim 1, wherein identifying types of packet data carried by the network for the mobile station comprises matching a data packet associated with the mobile station to one or more flow type profiles.

3. The method of claim 2, wherein each flow type profile comprises a packet-matching filter and matching a data packet associated with the mobile station to one or more flow type profiles comprises comparing information in the data packet to the packet-matching filters.

4. The method of claim 3, wherein each flow type profile further comprises one or more parameter values.

5. The method of claim 4, wherein the one or more parameter values includes an activity timer value to time activity expiration for packet flows matching the flow type profile.

6. The method of claim 4, wherein the one or more parameter values includes a dormancy timer value to time mobile station dormancy for packet flows matching the flow type profile.

7. The method of claim 4, further comprising maintaining an active flow set for the mobile station based on matching packet data for the mobile station to the flow type profiles.

8. The method of claim 7, wherein maintaining the active flow set for the mobile station comprises adding a flow to the active flow set responsive to a data packet matching a packet-matching filter in one of the flow type profiles.

9. The method of claim 8, wherein adding a flow to the active flow set comprises adding the one or more parameter values from the matched flow type profile to the active flow set.

10. The method of claim 9, further comprising setting the value of one or more of the resource control parameters in the parameter set for the mobile station based on selecting parameter values from the active flow set.

11. The method of claim 10, wherein the active flow set includes duplicate parameter values for controlling a given resource control parameter when the active flow set contains a plurality of flows, and further comprising selecting one of the duplicate parameter values for use as a controlling parameter value for the given resource control parameter.

12. The method of claim 7, wherein each flow in the active flow set has an associated activity timer, and further comprising removing a flow from the active flow set responsive to expiration of the associated activity timer.

13. The method of claim 12, further comprising setting an expiration period of the activity timer associated with a flow in the active flow set based on the activity timer value in the flow type profile corresponding to the flow.

14. The method of claim 13, further comprising resetting the activity timer for the flow responsive to matching a data packet with the packet-matching filter in the corresponding flow type profile.

15. The method of claim 8, wherein maintaining the active flow set further comprises removing a flow from the active flow set based on receiving an end-of-flow packet for that flow.

16. The method of claim 8, wherein maintaining the active flow set further comprises removing a flow from the active flow set based on receiving a packet signifying termination of that flow.

17. The method of claim 7, wherein each flow type profile comprises one or more parameter values, and wherein each flow in the active flow set includes the parameter values from the corresponding flow type profile.

18. The method of claim 17, further comprising generating an application activity profile for the mobile station as a combined parameter set derived from the parameter values from the flows in active flow set.

19. The method of claim 18, further comprising controlling one or more network communication resources associated with the mobile station based on the application activity profile.

20. The method of claim 19, further comprising:
generating application activity profiles for a plurality of mobile stations; and
controlling one or more network communication resources for each mobile station based on the application activity profile for the mobile station.

21. The method of claim 1, wherein setting values for one or more of the resource control parameters in the parameter set comprises setting a dormancy timer for the mobile station.

22. The method of claim 1, wherein setting values for one or more of the resource control parameters in the parameter set comprises setting radio channel allocation information for the mobile station.

23. The method of claim 22, wherein setting radio channel allocation information comprises setting a flag to trigger supplemental radio channel allocation for the mobile station.

24. The method of claim 1, wherein setting values for one or more of the resource control parameters in the parameter set comprises setting one or more Quality-of-Service parameters.

25. A method of controlling wireless communication resources in a wireless communication network comprising:
defining one or more flow type profiles, each flow type profile comprising one or more parameter values for use by the network in managing selected communication resources;
generating an application activity profile for each of a plurality of mobile stations by determining whether packet data carried by the network for the mobile station matches one or more of the flow type profiles; and
managing the selected communication resources based at least in part on the application activity profiles.

26. The method of claim 25, wherein generating the application activity profile for each of a plurality of mobile stations comprises deriving a combined set of control parameters having parameter values selected from among the parameter values in the matched flow type profiles.

27. The method of claim 26, further comprising maintaining an active flow set for each mobile station corresponding to the flow type profiles matched by the packet data associated with the mobile station, wherein the active flow set includes the parameter values of the matched flow type profiles.

28. The method of claim 27, wherein the parameter values for the combined set of control parameters are selected from the parameter values in the active flow set.

29. The method of claim 27, wherein maintaining the active flow set for each mobile station comprises adding a flow to the active flow set responsive to receiving a data packet corresponding to a newly matched flow type profile, and wherein adding a flow comprises adding the parameter values from the newly matched flow type profile to the active flow set.

30. The method of claim 29, further comprising retaining a flow already in the active flow set responsive to receiving a data packet matching the corresponding flow type profile, and wherein retaining a flow in the active flow set comprises retaining the parameter values for the matched flow type profile in the active flow set.

31. The method of claim 27, wherein maintaining the active flow set for each mobile station comprises removing a flow from the active flow set responsive to expiration of an activity timer associated with the flow, and wherein removing a flow from the active flow set comprises removing the parameter values associated with the corresponding flow type profile.

32. The method of claim 31, further comprising resetting the activity timer of a flow in the active flow set responsive to receiving a data packet matching the corresponding flow type profile.

33. The method of claim 27, wherein maintaining the active flow set for each mobile station comprises removing a flow from the active flow set responsive to receiving a data packet indicating expiration of that flow.

34. The method of claim 25, wherein determining whether packet data carried by the network for the mobile station matches one or more of the flow type profiles comprises comparing header information in one or more data packets to defined packet filters.

35. The method of claim 34, further comprising associating one or more defined packet filters with each flow type profile.

36. The method of claim 35, wherein the header information comprises at least one of assigned port number and protocol information.

37. The method of claim 25, wherein managing the selected communication resources based at least in part on the application activity profiles comprises using resource control parameter values in the application activity profiles to control corresponding network communication resources.

38. The method of claim 25, wherein managing the selected communication resources based at least in part on the application activity profiles comprises controlling one or more Quality-of-Service settings for each mobile station based on one or more parameter values in the corresponding application activity profile.

39. The method of claim 25, wherein managing the selected communication resources based at least in part on the application activity profiles comprise controlling radio transceiver resources for each mobile station based on one or more parameter values in the corresponding application activity profile.

40. The method of claim 25, wherein managing the selected communication resources based at least in part on the application activity profiles comprise controlling radio channel allocation for each mobile station based on one or more parameter values in the corresponding application activity profile.

41. The method of claim 25, wherein managing the selected communication resources based at least in part on the application activity profiles comprise controlling dormancy timer expiration for each mobile station based on one or more parameter values in the corresponding application activity profile.

42. A wireless communication network comprising:
profiling processes to generate an application activity profile for each of a plurality of mobile stations based on the type of packet data traffic associated with the mobile station; and
one or more resource managers to control selected communication resources used by the wireless communication network to route the packet data traffic, wherein said one or more resource managers use the application activity profiles to control the selected communication resources.

43. The network of claim 42, wherein routing the packet data traffic for the plurality of mobile stations includes wirelessly transmitting and receiving packet data to and from the mobile stations.

44. The network of claim 42, wherein the network comprises a Radio Access Network (RAN) and a Packet Core Network (PCN), and wherein the one or more resource managers reside in at least one of the RAN and the PCN.

45. The network of claim 44, wherein the PCN comprises a packet data router that routes packet data between the RAN and one or more external networks.

46. The network of claim 45, wherein the packet data router implements the profiling processes.

47. The network of claim 45, wherein the packet data router is a Packet Data Serving Node (PDSN).

48. The network of claim 44, wherein the RAN comprises a Base Station Controller (BSC) and one or more associated Radio Base Stations (RBSs), and wherein the one or more resource managers comprise a resource controller in the BSC.

49. The network of claim 48, wherein the resource controller in the BSC controls radio resources in the RBSs based at least in part on the application activity profiles.

50. The network of claim 42, further comprising one or more flow type profiles, wherein each flow type profile comprises a defined packet matching filter and one or more parameter values for use in controlling the selected communication resources.

51. The network of claim 50, wherein each profiling process identifies the type of packet data traffic associated with the corresponding mobile station by using the packet matching filters from the flow type profiles.

52. The network of claim 51, further comprising packet matching functions, each identifying the type of packet data traffic associated with the corresponding mobile station based on matching data packets carried by the network for the mobile station to the packet matching filters.

53. The network of claim 52, further comprising an active flow set for each mobile station, wherein the active flow set comprises an active flow for each matched flow type profile, and wherein each active flow comprises the parameter values from the corresponding matched flow type profile.

54. The network of claim 53, further comprising a controller/combiner to generate the application activity profile for each mobile station based on processing the active flows in the active flow set corresponding to the mobile station.

* * * * *